United States Patent Office 3,422,051
Patented Jan. 14, 1969

3,422,051
PROCESS FOR SUPPRESSING MOLECULAR JUMP IN THE PREPARATION OF SULFUR-VULCANIZABLE ELASTOMERS
Paul G. Carpenter, Baton Rouge, La., assignor to Copolymer Rubber & Chemical Corporation, a corporation of Louisiana
No Drawing. Filed June 10, 1966, Ser. No. 556,550
U.S. Cl. 260—33.6        11 Claims
Int. Cl. C08f 15/40; C08f 19/00; C08f 1/88

ABSTRACT OF THE DISCLOSURE

Sulfur vulcanizable elastomers are prepared by interpolymerizing monomeric mixture containing ethylene, at least one alpha monoolefin containing 3–16 carbon atoms and a polyene in solution in an organic solvent in the presence of an active Ziegler polymerization catalyst, followed by deactivating the catalyst and recovering the elastomer from the organic solvent solution. The elastomer is subject to molecular jump during the catalyst deactivation step, the molecular jump is suppressed by admixing a petroleum-based rubbery polymer extender oil with the organic solvent solution of the elastomer containing the active Ziegler catalyst prior to the catalyst deactivation step.

---

This invention relates to a novel process for preparing sulfur-vulcanizable elastomers by solution polymerization of a monomeric mixture of alpha-monoolefins and a polyene in the presence of a Ziegler polymerization catalyst whereby molecular jump may be suppressed during the subsequent deactivation of the catalyst.

It is known that elastomers may be prepared by interpolymerizing a monomeric mixture composed of ethylene and at least one higher straight chain alpha-monoolefin in solution in an organic solvent and in the presence of a Ziegler polymerization catalyst. However, the resulting elastomers are not sulfur vulcanizable as they contain no ethylenic unsaturation. Substances other than sulfur must be used for curing purposes, such as the organic peroxides.

Efforts have been made heretofore to provide ethylenic unsaturation in the above-mentioned class of elastomers by including a reactive monomeric polyene in the mixture of straight chain alpha-monoolefins to be polymerized. The resulting interpolymer contains residual ethylenic unsaturation, and it may be readily cured with sulfur following prior art practices to thereby produce vulcanized elastomeric products.

In polymerizing monomeric mixtures including ethylene, at least one straight chain alpha-monoolefin containing about 3–16 carbon atoms, and a polyene in accordance with prior art practices, it has been found that if the resulting cement is contacted with air and/or water in the presence of the active polymerization catalyst, the molecular weight often increases drastically and a cross-linked product of poor processibility is produced. This drastic increase in molecular weight is commonly referred to as molecular jump, and it is especially pronounced when the polymerization catalyst is destroyed by addition of water. Molecular jump results in a less desirable or unsatisfactory elastomeric product and, in view of this, the control of molecular jump is of great importance from a practical standpoint. As a result, the art has long sought an entirely satisfactory process for killing the polymerization catalyst whereby molecular jump may be controlled.

It is an object of the present invention to provide a novel process for preparing sulfur-vulcanizable elastomers wherein molecular jump may be suppressed or prevented.

It is a further object to provide a novel process for polymerizing monomeric mixtures including alpha-monoolefins and polyenes in solution in an organic solvent and in the presence of a Ziegler polymerization catalyst, whereby the active catalyst in the resulting solution of polymer may be deactivated without encountering a drastic increase in the molecular weight of the dissolved polymer.

It is still a further object of the invention to provide a novel process for polymerizing a monomeric mixture containing ethylene, propylene and polyene in solution in an organic solvent and in the presence of a Ziegler polymerization catalyst, in which the active catalyst in the resulting solution polymer may be deactivated under conditions whereby molecular jump may be controlled, and thereafter the solution of polymer may be washed free of the catalyst residue with water and the polymer recovered from the solvent in the form of a crumb having a low ash content.

Still other objects and advantages of the invention will be apparent to those skilled in the art upon reference to the following detailed discussion and the examples.

It has been discovered that molecular jump which occurs during the catalyst deactivation step following polymerization may be suppressed or prevented entirely by addition of an extender oil to the resulting solution of polymer containing the active catalyst. The addition of the extender oil deactivates or destroys the catalyst, either completely or at least to a sufficient extent that molecular jump is no longer a problem when the solution of polymer is subsequently thereto contacted with air and/or a catalyst deactivator, such as water. Thus, it is possible to subsequently add water and intimately admix the water with the solution of polymer for the purpose of washing the catalyst residue therefrom.

Prior art reaction conditions may be used when preparing the solution of polymer to be treated in accordance with the invention. Examples of patents which disclose satisfactory procedures for preparing elastomers from monomeric mixtures of alpha-monoolefins and polyenes include United States Patent Nos. 2,933,480, 3,093,620, 3,093,621 and 3,211,709, the disclosures of which are incorporated herein by reference. The polymerization procedures disclosed therein produce a solution of the elastomers in an organic solvent which contains the active Ziegler polymerization catalyst. The catalyst is deactivated in accordance with the invention prior to recovery of the solid elastomer from the solution.

The oil that is added to the solution of elastomer to deactivate the catalyst may be a commercially available extender or processing oil, including naphthenic, highly naphthenic, aromatic, highly aromatic and paraffinic extender and processing oils. Such oils are usually derived from petroleum and, in general, include petroleum-based rubbery polymer extender oils or processing oils, which are normally added to ethylene-propylene-diene monomer rubbers, styrene-butadiene rubber, cis-1,4-polybutadiene, cis-1,4-polyisoprene, etc. The oils meeting ASTM specification No. D–2226, types 101, 102 and 103 also may be used. Highly naphthenic petroleum-based oils are usually preferred. The foregoing oils are referred to collectively in the claims as being extender oils.

The oil may be introduced into the solution of elastomer by any convenient method. For instance, the substantially water-free oil may be heated until it is fluid and relatively non-viscous, and then added to the solution of elastomer with vigorous agitation. The solution of elastomer also may be heated to an elevated temperature to aid in dissolving the oil therein. The extender oils of commerce are usually viscous in nature, and preferably the oil is first dissolved in a quantity of dry, fresh polymerization solvent so as to form a non-viscous solution, and then the solution of oil is added to the solution of elastomer with vigorous agitation.

The amount of oil to be added in a given instance may vary over wide ranges. It is only necessary that enough oil be added to suppress molecular jump, but much larger quantities may be added when this is desirable. The amount of oil may vary from as little as 5, 10 or 20 parts by weight per 100 parts by weight of elastomer, up to 100, 200, 300 or 400 parts by weight per 100 parts by weight of elastomer. Oil additions of about 20–80 parts by weight per 100 parts by weight of elastomer are usually preferred. The specific amount of oil that is selected will usually depend upon the desired oil content in the solid elastomer as an oil extended product is produced. Thus, the present invention provides a unique and highly satisfactory method of producing oil extended elastomers, as well as suppressing or preventing molecular jump.

After adding the oil as discussed above, the solution of elastomer may be thoroughly washed with water to remove catalyst residue. The resulting deashed solution of polymer may be passed to a prior art process for removing the solvent and recovering the solid elastomer in a desired form such as crumb. For instance, the elastomer may be recovered by introducing the solution below the surface of a body of hot water maintained in a coagulation tank to which steam is supplied continuously. The solvent is evaporated and recovered overhead, and the elastomer is recovered in the form of a slurry of crumb. The crumb may be withdrawn, stripped with steam in a second vessel to remove traces of solvent, washed with water to remove any remaining catalyst residue, dewatered, dried by means of a prior art extrusion dryer or an apron dryer, and baled.

The specific monomers and ratios of monomers to be polymerized in accordance with the invention need not differ from those used in the prior art. In many instances, it is preferred that the elastomers be prepared from a monomeric mixture containing ethylene, propylene and a polyene, and the elastomer may contain chemically bound therein molar ratios of ethylene to propylene varying between 80:20 and 20:80, and preferably between 70:30 and 55:45. The polyene may be chemically bound in the elastomer in an amount to provide an unsaturation level of not less than about 2 double bonds per thousand carbon atoms in the elastomer; however, much higher unsaturation levels are possible, such as up to, for example, 5, 10, 20 or 30 double bonds per thousand carbon atoms in the elastomer. The specific unsaturation level selected in a given instance will vary depending upon the desired properties in the elastomer, as is recognized in the art.

In instances where it is desired to prepare a tetrapolymer or an interpolymer from five or more different monomers, then one or more alpha-monoolefins containing about 4–16 carbon atoms should be substituted for an equal molar quantity of bound propylene in the above-mentioned elastomer composition. The range of the fourth monomer in tetrapolymers may be, for example, about 5–20 mol percent.

The polymerization solvent may be any suitable inert or saturated hydrocarbon which is liquid and relatively non-viscous under the reaction conditions, including the prior art solvents for the solution polymerization of monoolefins in the presence of Ziegler catalysts. Examples of satisfactory hydrocarbon solvents include open chain saturated hydrocarbons containing 5–8 carbon atoms, of which hexane is usually preferred; aromatic hydrocarbons and especially those containing a single benzene nucleus such as benzene, toluene, etc.; and saturated cyclic hydrocarbons which have boiling ranges approximating those for the open chain and aromatic hydrocarbons discussed above, and especially saturated cyclic hydrocarbons containing 5 or 6 carbon atoms in the ring. The solvent may be a mixture of one or more of the foregoing hydrocarbons, such as a mixture of aliphatic and naphthenic hydrocarbon isomers having approximately the same boiling range as normal hexane. It is necessary that the solvent be dry and free of substances which will interfere with the Ziegler catalyst to be used in the polymerization step, as is recognized by those skilled in this art.

Ziegler catalyst in accordance with the prior art may be used in preparing the solution polymer to be treated in accordance with the present invention. In general, any suitable prior art Ziegler-type catalyst may be used which is known to produce a satisfactory elastomer. Examples of such catalysts are disclosed in a large number of issued patents, such as United States Patents Nos. 2,933,480, 3,093,620, 3,093,621, 3,211,709 and 3,113,115. Examples of Ziegler catalysts include metal organic coordination catalysts prepared by contacting a compound of a metal of Groups IVa, Va, VIa and VIIa of the Mendelejeff periodic chart of the elements, as typified by titanium, vanadium and chromium halides, with an organometallic compound of a metal of Groups I, II or III of the Mendelejeff periodic chart which contains at least one carbon-metal bond, as typified by trialkyl aluminum and alkyl aluminum halides wherein the alkyl groups contain 1–20 carbon atoms.

The preferred Ziegler catalyst for many polymerizations is prepared from a vanadium compound and an alkyl-aluminum halide. Examples of suitable vanadium compounds include vanadium trichloride, vanadium tetrachloride, vanadium oxychloride, vanadium acetylacetonate, etc. Activators which are especially preferred include the alkylaluminum chlorides of the general formulae $A_1AlCl_2$ and $R_2AlCl$, and the corresponding sesquichlorides of the general formula $R_3Al_2Cl_3$, where R is a methyl, ethyl, propyl, butyl or isobutyl radical. A catalyst prepared from methyl or ethyl aluminum sesquichloride and vanadium oxychloride is especially preferred, and when using this catalyst, the optimum ratio of the catalyst components is usually one mol of vanadium oxychloride for each 8–20 mols of the alkylaluminum sesquichloride.

The present invention is especially useful in the preparation of sulfur-curable elastomers from monomeric mixtures including certain polyenes which have a pronounced tendency to cause molecular jump. Examples of such polyenes include the bridged ring polyenes disclosed in United States Patent Nos. 3,093,620, 3,093,621 and 3,211,-709, such as the 5-alkenyl-2-norbornenes and 5-alkylidene-2-norbornenes wherein the alkenyl group contains about 3–20 carbon atoms and the alkylidene group contains about 1–20 carbon atoms, and preferably up to about 8 carbon atoms in each instance. Certain diolefins such as 5-methylene-2-norbornene, 5-ethylidene-2-norbornene and dicyclopentadiene, and polyenes in general which have strained or highly active unsaturation, exhibit a greater tendency to cause molecular jump and the invention is most useful when these monomers are present in the monomeric mixture to be polymerized.

The foregoing detailed description and the following specific examples are for purposes of illustration only, and are not intended as being limiting to the spirit or scope of the appended claims.

Example I

The reaction vessel employed in this example was a one-half gallon Sutherland reactor equipped with a high speed, heavy-duty, air driven motor, cooling coils; a thermometer; a temperature regulator; a pressure regulator, an injection port; and other openings where monomers, catalyst, and solvent were fed to the reactor. A tube dipping to the bottom of the reactor was present for the removal of the cement which was produced on a continuous basis. A vapor phase vent was provided to bleed off 15% of the gaseous monomer feed to prevent inert gas buildup.

The clean reactor was assembled, rinsed with dry hexane and purged overnight with dry nitrogen. On the next morning, the reactor bowl was heated with a flameless blow-torch and hot water was run through the coils until the temperature in the reactor was about 70° C. Propylene was flushed through the reactor for about 15 minutes, and the temperature was lowered to ambient. One liter of Esso chemical grade hexane, dried over 4A molecular sieves and stored over sodium, was added to the reactor. As the temperature was brought to 40° C., propylene was fed to the reactor through a 4A molecular sieve column until 42.5 inches Hg pressure was reached. The pressure was then brought up to 61.1 inches Hg with ethylene fed through a 4A molecular sieve column and 2.8 millimoles (0.39 cc.) of pure 5-ethylidene-2-norbornene and 0.7 cc. of 1.5 M ethylaluminum sesquichloride were added.

The monomers were shut off and the catalyst components, i.e., 0.35 molar ethylaluminum sesquichloride and 0.036 molar vanadium oxytrichloride at a 12 to 1 aluminum to vanadium ratio were fed into the reactor at a constant rate until a drop in pressure in the reactor was noted. At this time the gaseous monomers were fed into the reactor through suitably calibrated rotometers at a rate of 1456 cc./minute, which volume contained 692 cc. of ethylene and 764 cc. of propylene. The 5-ethylidene-2-norbornene was added as a 0.22 M solution in hexane at 1.23 cc./minute and this amount provided about 2.3 weight percent for incorporation into the polymer. The polymerization was controlled by the catalyst pumps which added catalyst on demand as the pressure increased, thus maintaining the 61.1 inches Hg pressure throughout the run. When the solution became approximately 6% polymer, solvent containing 16 cc./cc. ethylene was fed into the reactor at the rate of 28.0 cc. per minute, and polymer cement was withdrawn which contained about 85 g. of polymer per hour.

At this time, the ethylene and propylene feeds were adjusted to 312 cc./minute and 1704 cc./minute, respectively, to compensate for the unreacted monomers removed with the cement. The third monomer rate was adjusted to 1.6 cc./minute.

The solution of polymer as removed from the reactor was fed without agitation into water to kill the active catalyst. The cement was then washed three times with equal volumes of water. The washed cement was fed with nitrogen pressure into a T joint at the bottom of a 4-liter container full of hot circulating water. The other end of the T was connected to a steam line and steam was admitted at such a rate as to superheat the rubber cement. The solvent and unreacted monomers were mostly removed by this procedure. The rubber crumb was collected on a screen, washed and chopped up in a Waring Blendor. The rubber crumb was dried in the oven at 90° C. to remove any remaining solvent and water giving a rubbery copolymer which contained 3.5% gel and had a reduced specific viscosity in Decalin at 135° C. of 4.03. The polymer was crosslinked and was almost unprocessible.

Example II

The procedure of Example I was repeated with the exception of admixing in the solution of polymer as removed from the reactor a dry hexane solution containing 10 parts by weight of a highly naphthenic petroleum based rubbery polymer extender oil for each 100 parts of the polymer. Thereafter, the oil extended solution of polymer was fed into the water and washed, and the subsequent procedure was as noted in Example I.

The resulting rubbery polymer contained no gel. After removal of the extender oil by extraction with alcohol, the polymer had a reduced specific viscosity in decalin at 135° C. of 2.57. The polymer was not unduly crosslinked and it was readily processable.

Example III

The procedure of Example II was repeated with the exception of adding 20 parts by weight of the extender oil per 100 parts of the polymer. Also, the extender oil was not extracted prior to determining the reduced solution viscosity and Mooney value. The reduced solution viscosity in Decalin at 135° C. was 2.24 and the Mooney value ($ML_4$) was 75. The polymer was readily processible and contained no gel.

What is claimed is:

1. In a process for preparing a sulfur-vulcanizable elastomer wherein a monomeric mixture containing ethylene, at least one alpha-monoolefin containing about 3–16 carbon atoms and a bridged ring polyene is interpolymerized in solution in an organic solvent in the presence of an active Ziegler polymerization catalyst to produce a solution of a sulfur-vulcanizable elastomer containing the active catalyst, the resulting elastomer containing about 20–80 moles of chemically bound ethylene for each 80–20 moles of chemically bound alpha-monoolefin containing 3–16 carbon atoms and the bridged ring polyene being chemically bound therein in an amount to provide about 2–30 carbon-to-carbon double bonds for each 1000 carbon atoms, the catalyst is deactivated and thereafter the elastomer is recovered from the organic solvent solution, the elastomer normally being subject to molecular jump during the catalyst deactivation step when the catalyst is deactivated by addition of water to the solution of elastomer, the improvement which comprises admixing a petroleum based rubbery polymer extender oil with the organic solvent solution of the elastomer containing the active Ziegler catalyst, the extender oil being admixed wtih the solution of elastomer in an amount to suppress molecular jump and to provide about 5–400 parts by weight of the extender oil for each 100 parts by weight of the elastomer washing the solution of elastomer with water subsequent to the addition of the extender oil to thereby suppress molecular jump while removing the catalyst residue, and thereafter recovering the elastomer from the organic solvent.

2. The process of claim 1 wherein the said alpha-monoolefin containing 3–16 carbon atoms is propylene.

3. The process of claim 1 wherein about 10–100 parts by weight of the extender oil for each 100 parts by weight of the elastomer is admixed with the solution of elastomer.

4. The process of claim 1 wherein the extender oil is selected from the group consisting of naphthenic, highly naphthenic, aromatic, highly aromatic and paraffinic petroleum based rubbery polymer extender oils.

5. The process of claim 1 wherein the extender oil is a highly naphthenic petroleum based rubbery polymer extender oil.

6. The process of claim 5 wherein about 20–80 parts of the highly naphthenic extender oil for each 100 parts by weight of the elastomer is admixed with the solution of elastomer.

7. The process of claim 1 wherein the extender oil is dissolved in an additional portion of the said organic solvent which is substantially free of water, and the resulting dry solution of extender oil is admixed with the solution of elastomer.

8. The process of claim 2 wherein the bridged ring polyene is selected from the group consisting of 5-alkenyl-2-norbornenes wherein the alkenyl group contains about 3–20 carbon atoms and 5-alkylidene-2-norbornenes wherein the alkylidene group contains about 1–20 carbon atoms.

9. The process of claim 2 wherein the Ziegler catalyst is prepared from an alkyl aluminum sesquichloride wherein the alkyl group contains about 1–4 carbon atoms and vanadium oxytrichloride, the polymer contains about 55–70 moles of chemically bound ethylene for each 45–30 moles of chemically bound propylene and the bridged ring compound is selected from the group consisting of 5- methylene-2-norbornene, 5-ethylidene-2-norbornene and dicyclopentadiene.

10. The process of claim 9 wherein the bridged ring compound is 5-ethylidene-2-norbornene.

11. The process of claim 10 wherein about 10–100 parts by weight of a highly naphthenic petroleum based rubbery polymer extender oil for each 100 parts by weight of the elastomer is dissolved in an additional portion of the said organic solvent which is substantially free of water, and the resulting dry solution of the extender oil is admixed with the solution of elastomer.

References Cited
UNITED STATES PATENTS

| | | | |
|---|---|---|---|
| 3,081,276 | 3/1963 | Snyder et al. | 260—33.6 |
| 3,093,620 | 6/1963 | Gladding et al. | 260—80.78 |
| 3,222,332 | 12/1965 | Duck et al. | 260—80.78 |
| 3,260,708 | 7/1966 | Natta et al. | 260—80.78 |

ALLAN LIEBERMAN, *Primary Examiner.*

U.S. Cl. X.R.

260—80.78